(12) United States Patent
Taylor

(10) Patent No.: US 7,263,361 B2
(45) Date of Patent: Aug. 28, 2007

(54) PROVISION OF SERVICES VIA AN INFORMATION TECHNOLOGY NETWORK

(75) Inventor: Richard Taylor, Bristol (GB)

(73) Assignee: Hewlett-Packard Development Company L.P., Houston, TX (US)

( * ) Notice: Subject to any disclaimer, the term of this patent is extended or adjusted under 35 U.S.C. 154(b) by 969 days.

(21) Appl. No.: 09/983,817

(22) Filed: Oct. 26, 2001

(65) Prior Publication Data

US 2002/0142769 A1 Oct. 3, 2002

(30) Foreign Application Priority Data

Mar. 2, 2001 (EP) .................................. 01301921

(51) Int. Cl.
*H04Q 7/20* (2006.01)

(52) U.S. Cl. ................ 455/450; 455/452.1; 455/452.2; 455/556.2; 455/557

(58) Field of Classification Search ................ 455/450, 455/452.1, 452.2, 556.2, 557, 426.1, 426.2
See application file for complete search history.

(56) References Cited

U.S. PATENT DOCUMENTS

| | | | | |
|---|---|---|---|---|
| 5,887,063 A * | 3/1999 | Varadharajan et al. ...... | 713/172 |
| 6,138,158 A * | 10/2000 | Boyle et al. ................. | 709/225 |
| 6,236,645 B1 * | 5/2001 | Agazzi ........................ | 370/286 |
| 6,275,496 B1 * | 8/2001 | Burns et al. ................. | 370/429 |
| 6,317,831 B1 * | 11/2001 | King ........................... | 713/171 |
| 6,351,640 B1 * | 2/2002 | DeMont .................. | 455/426.1 |
| 6,396,612 B1 * | 5/2002 | Bjorndahl .................... | 398/121 |
| 6,519,460 B1 * | 2/2003 | Haartsen ................... | 455/452.1 |
| 2001/0054066 A1 * | 12/2001 | Spitzer ........................ | 709/203 |
| 2002/0085515 A1 * | 7/2002 | Jaynes et al. ............... | 370/329 |
| 2004/0162059 A1 * | 8/2004 | Hiltunen et al. ......... | 455/412.1 |

FOREIGN PATENT DOCUMENTS

| WO | WO98/17032 | 4/1998 |
|---|---|---|
| WO | WO 00/26760 | 5/2000 |

OTHER PUBLICATIONS

Haartsen, J., "Bluetooth—The Universal Radio Interface For Ad Hoc, Wireless Connectivity," Ericsson Review No. 3, pp. 110-117, Stockholm, 1998.

* cited by examiner

*Primary Examiner*—Charles N. Appiah
*Assistant Examiner*—Bryan Fox

(57) ABSTRACT

Information services may be provided to a user of a personal digital assistant (PDA) via an infra red wireless communication port. The PDA recruits communication with a peer, such as a beacon, via this link, and the PDA and peer exchange messages containing the URLs of their proxies within the Internet. The proxies contact each other and negotiate, via the exchange of XML documents, parameters governing exchange of messages via the infra red link, such parameters being related inter alia to technical aspects of communication (e.g. file size, software compatibility etc.), encryption (e.g. public key information), and policy, which determines what the IR wireless link may be employed for, such as what content is sought. Negotiation between proxies is relatively rapid due to the higher bandwidth of the link between them in comparison to the IR link.

24 Claims, 9 Drawing Sheets

XML10

```
<?xml version="1.0">
<P10PrincipalDataSpecDatLevlRatD>
    <P10:Capability>
        <P10:MaxBaudKbpersec> 2000 </P10:MaxBaudKbpersec>
        <P10:CacheSizeMb > 3 </P10:CacheSizeMb >
        <P10:ScreenSizePxl> 120×140 </P10:ScreenSizePxl>
        <P10:ScreenType> Colour </P10:ScreenType>
    </P10:Capability>
    <P10: OwnerUser>
        <P10:Name>Ian Curtis</P10:Name>
        <P10:Paymt1>5818 2929 1234 5678visa Expires0198</P10:Paymt1>
        <P10:Paymt2>CampagCash</P10:Paymt2>
        </P10:OwnerUser>
    <P10:PublicKey>
        Nemesis24
    </P10:PublicKey>
    <P10:PolicyInfo>
        <P10:LanguagePref1>English</P10:LanguagePref1>
        <P10:LanguagePref2>Italian</P10:LanguagePref2>
        <P10:FoodPref1>Vegetarian</P10:FoodPref1>
        <P10:FoodPref2>Fish</P10:FoodPref2>
    </P10:PolicyInfo>
</P10PrincipalDataSpecDatLevlRatD>
```

Fig. 5

XML30

<?xml version="1.0">

<P30PrincipalDataSpecDatLevlRatD>

<P30:Capability>

<P30:MaxBaudKbpersec> 1000 </P30:MaxBaudKbpersec>

<P30:CacheSizeMb > 2 </P30:CacheSizeMb >

<P30:ScreenSizePxl> 90×100 </P30:ScreenSizePxl>

<P30:ScreenType> BlackandWhite </P30:ScreenType>

</P30:Capability>

<P30:OwnerUser>

<P30:Name>Jack Ruby</P30:Name>

<P30:Paymt1>5234 0000 1111 2222visaExpires0200</P30:Paymt1>

</P30:OwnerUser>

<P30:PublicKey>

18TitlesLFC

</P30:PublicKey>

<P30:PolicyInfo>

<P30:LanguagePref1>Urdu</P30:LanguagePref1>

<P30:LanguagePref2>Italian</P30:LanguagePref2>

</P30:PolicyInfo>

</P30PrincipalDataSpecDatLevlRatD>

Fig. 6

PROVISION OF SERVICES VIA AN INFORMATION TECHNOLOGY NETWORK

BACKGROUND TO THE INVENTION

1. Field of the Invention

The present invention relates to the provision of services via an information technology network, such as the internet, and to the provision of services from such a network to information devices, such as portable information devices, including personal digital assistants ("PDA"), mobile telephones or portable computers.

2. Description of Related Art

In recent years there has been a substantial commercial uptake in the use of portable information devices. Mobile telephones are now ubiquitous in most technologically developed countries, and increasingly provide information processing capability beyond that associated directly with the making of telephone calls, with some mobile telephones now incorporating an electronic personal organiser. Similarly PDAs have evolved from simply being an electronic personal organiser to incorporate capabilities such as the ability to play MP3 music files. Notebook computers are now of a size which is limited only by the perceived need for the computer to have a relatively large screen (c.f. a piece of A4 paper) and a keyboard operable by touch typing. Any distinction between different types of portable information device is rapidly becoming blurred to the extent that it may not in future be appropriate to attempt to classify a particular such device using contemporary nomenclature. A common feature of many currently produced portable information devices is the provision of a short-range wireless communication port. This port may be a Bluetooth port, using electromagnetic radiation in an ISM Frequency band above 2.5 GHz, or an infra red port (operable in normal conditions over a distance of order of magnitude 10-20 meters), or in some information devices both. Standards have been set for protocols governing communications using such wireless media, meaning that, in theory, a given information device equipped with a short range wireless communication port should be able to communicate with any other such information device.

In practice however communication with or between information devices via such ports is not straightforward. Issues such as the intrinsic capability (as a result either of hardware or software) of a device, and the possibility of using encryption of data complicate matters. Therefore, in the absence of at least a degree of prior knowledge relating to the capability of an information device and/or the level of information which may be exchanged, useful communications with, or between such devices are extremely difficult to establish. As an example of the extent to which communications between users rely on prior knowledge of computing capability, consider a user with a desktop PC who wishes to communicate with another user in an information technology network. The user will typically send data, such as text, in the form of a pdf file, or a file created by word processing software such as Microsoft Word, with a reasonable expectation that the intended recipient of the data will be able to assimilate it. The aforementioned expectation has become increasingly reliably met over time as what is essentially a de facto standard basic specification for a desktop computer has become widely established.

Currently the same cannot be said to be true for information devices. Moreover, it is by no means a foregone conclusion that in future the specifications of differing information devices, offered by different manufacturers, and for predominantly different purposes, are necessarily going to converge toward a single standardised specification. Gaining an understanding of the manner in which effective and useful data exchange may take place between two such devices is typically difficult to achieve using only the devices. The process is necessarily an iterative process of trial and error: one device sends a message to the other, and the receiving device then indicates what part, if any of the message was understood/useable/relevant (as the case may be), whereupon the first device then sends a further modified message, and so on. The speed of such an iterative process is limited principally by two factors: the speed of data transmission using the wireless link between the devices, and the computing power (i.e. processing and storage capability) of the devices.

SUMMARY OF THE INVENTION

A first aspect of the present invention aims to ameliorate such difficulties by the use of proxy computing entities for the information devices, the proxies having a relatively standardised specification. The proxy entities exchange information relating to the nature of the devices, and establish parameters for direct communication between the devices. Once such parameters have been established, the devices then communicate with each other via a wireless link, in conformity with the parameters, either with or without the active participation of the proxies as required. The proxy entities will preferably communicate via a communication channel having a wider frequency bandwidth than that provided by the wireless communication ports of such devices, thus enabling a relatively rapid exchange of information to facilitate a correspondingly rapid establishment of the aforementioned parameters. Typically, in the case of portable devices, the devices will have a proxy which operates from an internet address, contactable via the telephone network using a mobile telephone link within the portable device, however hard-wired connections to the telephone network are also envisaged.

A first aspect of the present invention provides a method of communication between first and second information devices, comprising the steps of:
  initiating communication between the devices by alerting one of the devices to the presence of another;
  passing at least one message between the devices to provide to the first device the address within the network of a second proxy entity for the second device;
  connecting the first device to a first proxy entity for the first device, and passing to the first proxy the address within the network of the second proxy;
  passing messages between the first and second proxies to establish at least one parameter governing data exchange between the first and second devices; and
  conducting communication between the first and second devices in accordance with the at least one parameter by passing messages at least directly between the devices.

One or both the information devices may be portable. For example in one scenario a first user having a portable PDA is walking through an area (e.g. a museum) populated with a one or more fixed beacons operating on behalf of a second user, and direct communications between the portable PDA and the or each beacon is established using proxies for both the beacons and the PDA.

The proxies are preferably each part of an information technology network such as the Internet, for example, thus enabling easy and relatively rapid interconnection. In one embodiment, the proxies are connected to each other via a communications channel having a wider frequency bandwidth than the frequency bandwidth of the communication channel via which messages are exchanged initially between the devices, thus enabling, for a given ratio of signal to noise, more rapid transmission of data between the proxies. Communication between the devices may then include relaying messages received by one device to the proxy of that device (e.g. for processing) depending upon the agreed parameter(s) of the direct communication between the devices. Alternatively the communication may involve simply the devices.

Connection of the devices to the proxies may be achieved in any suitable manner, such as for example by wireless means, typically using a mobile phone type connection in the case of proxies accessible via a telephone network, or in certain circumstances, a land line or another suitable form of hard-wired connection.

Parameters governing direct communication between the devices may relate to the format in which data may be assimilated by each device, the rate at which each device is capable of receiving data (both of which are a function of the intrinsic capabilities of a device), public key information for transmission of encrypted data, and parameters determining policy, which serve the function of governing the uses to which any communication between the devices may be put. Policy parameters include parameters governing the nature of content which a device wishes to receive, the manner of its provision, as well as such matters as for example spending limits (whether for individual transactions or aggregate limits), the language in which content is provided, and so on.

One of the advantages of establishing parameters for direct communication between the devices by proxies, and particularly proxies connected to the internet, lies in the standardised nature of such proxies, and the resultant high probability that a significant exchange of assimilable data may take place between them. A further independent advantage lies in the relatively wide frequency bandwidth communication channel (i.e. in comparison to that of the communication channel between the devices) that typically exists between the proxies, resulting in the provision, for a given signal to noise ratio, of a relatively high speed communication channel between the proxies.

Accordingly, a further independent aspect of the present invention provides a method of communication between first and second information devices, comprising the steps of:
  initiating communication between the devices using a first channel of communication having a first frequency bandwidth;
  using the first channel, passing at least one message between the devices containing data enabling interconnection of the first and second devices via a second channel of communication having a wider frequency bandwidth than the first channel;
  using the second channel to exchange data between the devices to establish at least one parameter governing data exchange between the devices via the first channel; and
  conducting communication between the devices using at least the first channel in accordance with the at least one parameter.

Thus where a significant bar to establishing one or more parameters governing data exchange between the devices is the amount of data that needs to be exchanged between the devices, this may be performed via a higher speed data link (which will typically be more expensive), whereupon once parameter(s) have been established direct communication (which is typically relatively inexpensive) between the devices via a wireless link may then be used. One example in which speed of data transmission is important in comparison to other factors is where the devices are equipped with sufficient computing power to perform the proxy transactions (or the proxies are effectively part of the devices). In such a situation the speed of direct data transmission between the devices becomes at least one of the most significant factors in the time required to establish one or more parameters for direct communication.

Messages passing between the users via the low bandwidth medium may be relayed to the proxies if desired, for example in the event that a, or each proxy is required in order to process a message.

In more complex scenarios, the methods of the present invention may be applied to establish multi-user direct communication.

BRIEF DESCRIPTION OF DRAWINGS

Embodiments of the invention will now be described, by way of example, and with reference to the accompanying drawings, in which:

FIGS. 5 and 6 are XML documents;

DESCRIPTION OF PREFERRED EMBODIMENTS

Figure 1:
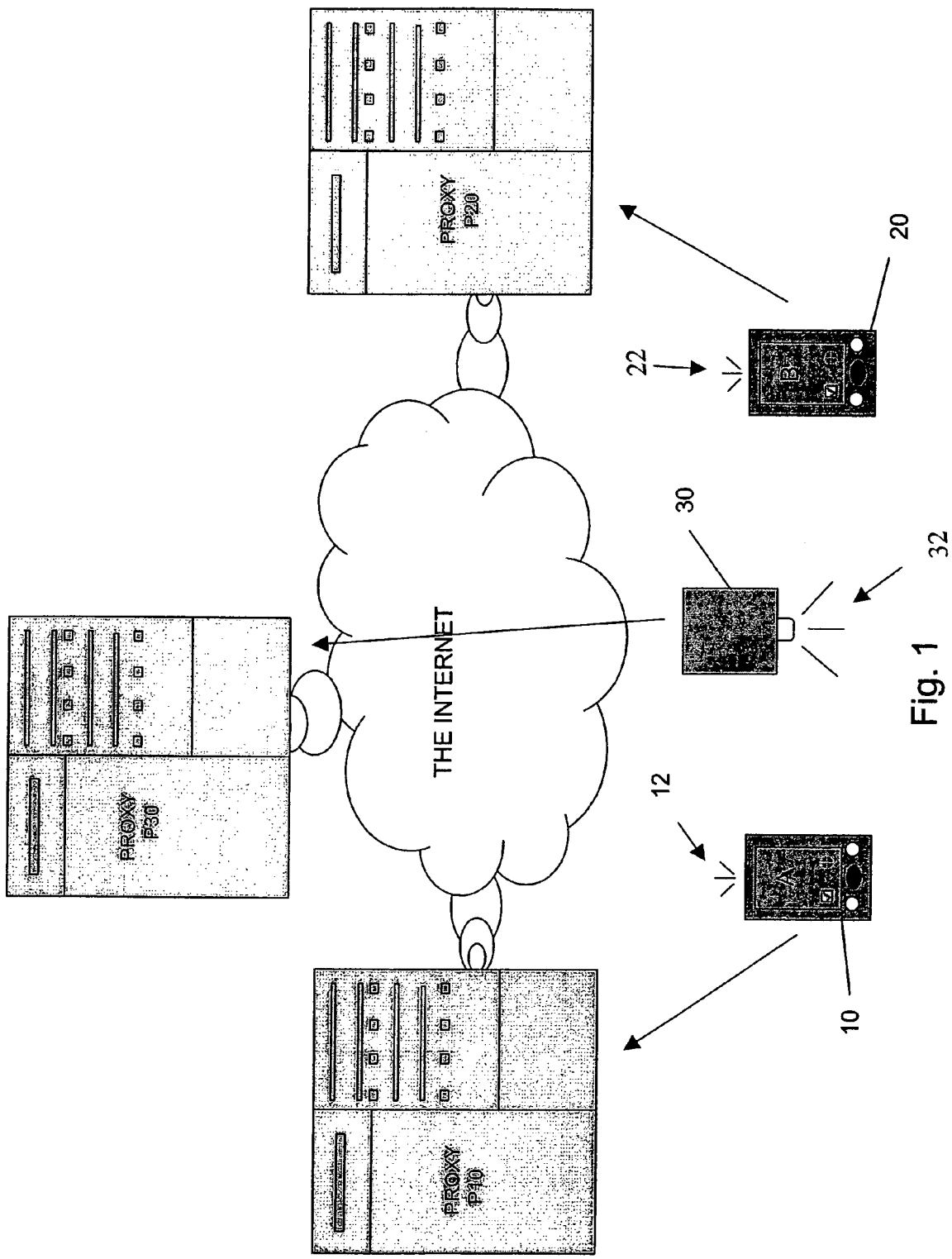
FIG. 1 is a schematic illustration of a scenario in which an embodiment of the present invention may be employed.

Referring now to FIG. 1, a simple scenario contemplated by the present invention has three information devices 10, 20, 30, two of which, 10 and 20, are portable, while the third, 30, has a fixed location. A first user, who is the owner of portable information device 10, here having the form of a personal digital assistant ("PDA") 10, encounters a second user, the owner portable device 20, which in the present example is also a PDA. Both users are also within range of the fixed information device 30, here having the form of a beacon 30. Each of the information devices 10, 20, 30 have a wireless communication port 12, 22, 32, which in this example is an infra red communication port. Typically all such ports conform to a standard known as IRDA, and so accordingly the protocol governing the manner in which communications using such ports are to be established, maintained and then terminated is well understood, meaning that the transmission and receipt per se of data between two such devices is a straightforward matter. However, as mentioned above, this does not necessarily mean that the devices are mutually compatible for the exchange of meaningful data using this communication medium at any other level of the system architecture, or put another way, although messages may reliably be passed between the devices, the messages are not necessarily understood by the recipient.

According to a first scenario, the first and second users wish to communicate with each other using their PDAs 10 and 20 respectively, in this example because the first user has possession of valuable data, stored within the PDA 10 in a spreadsheet format, which the second user wishes to purchase. The first user therefore wishes to transfer a copy of this data into PDA 20 of the second user via the wireless communication ports 12, 22. In the event that both PDAs 10 and 20 are made by the same manufacturer, have substantially the same specification and are of a similar generation or version, then this communication may quite possibly be conducted simply by the first user sending a copy of the file in which the spreadsheet is saved from PDA 10 via the communication port 12, to PDA 20 via the communication port 22. However, even in this very simplified scenario it is possible that the PDA 20, may not be able to assimilate the data sent from PDA 10. For example, if PDA 10 has a later version of the spreadsheet software which was used to create the data file to be sent to PDA 20, this will in all probability not be able to be read by the older version of the same spreadsheet software running in PDA 20 (c.f. different versions of Microsoft Word—newer versions can read files created by older versions, but not vice versa).

More generally, it cannot be assumed that the PDAs will be as similar as postulated above, and so it is unlikely that difficulties in exchanging meaningful messages will be limited to the relatively minor problem of different versions of the same software exemplified above. Further factors which determine whether a message is assimilable include the hardware specification of the recipient information device, such as for example the amount of available memory in the recipient PDA, and the extent to which it may support graphics and/or sound, etc. Moreover, in the illustrated scenario, it is quite likely, in the event that the data passing from PDA 10 to PDA 20 is worth money, that it requires encryption. This usually requires the transmission of public key information to the transmitting PDA 10 from the receiving PDA 20 (unless private key information has been established). Clearly therefore, in order to conduct useful communication between two such devices it is necessary to establish parameters governing the nature of the messages that are to be exchanged. The only way of achieving this however is as a result of communication between the two devices. At a conceptual level this problem is not intrinsically insoluble, and may simply be solved by an iterative process of trial and error, involving the repetitive exchange of messages until a sufficient degree of "understanding" has been established between the devices to permit the requisite information to be transmitted in an appropriate form.

In practice however two independent aspects of information devices, and in particular portable devices, render this iterative process for establishing parameters for meaningful communication impracticable. Firstly, portable information devices are typically configured relatively inflexibly, because their portability places a practical limit on their hardware specification, which in turn limits the flexibility of their software. Thus for example while a portable information device may be extremely well suited to performing a variety of tasks for which it has been specifically designed (e.g. in the case of a PDA, storage of address book, diary, supporting the running of spreadsheet programs and other application software, and creation and reading of email), the vast majority of its processing and storage capability will be dedicated to the performance of such tasks, and very little (if any) capability will be reserved to enable a user to configure the device to operate differently. This situation is not likely to be ameliorated by the inevitable future provision of yet more processing and storage capability for a given size and weight restriction, simply because any extra such capability will most likely be used by manufacturers to provide yet better or enhanced performance of the aforementioned (or similar) tasks, rather than the additional ability for a user to reconfigure the device if they so wish (the majority of users of such devices would not have the ability, for example to make adjustments to the operating system of the device necessary in order to exchange messages rapidly with another device, and would therefore perceive no added value in being able to do so). The second factor is one of speed of data transmission across the wireless communication link, which in this example is infra red. This link has a frequency bandwidth such that, other than under optimum noise conditions (i.e. conditions which are not present in ordinary practical use), the data link will have a relatively slow speed of data transmission, thus increasing the time required for the exchange of messages required to establish parameters for meaningful communication.

In accordance with the present invention, the aforementioned difficulties in establishing communications are overcome by providing, for each of the information devices 10, 20, 30 a proxy computing entity P10, P20, P30 respectively. In the present embodiment, the proxy entities P10, P20, P30 are computer programs hosted by servers connected to the internet. When one of the information devices, e.g. PDA 10 wishes to establish wireless comms. with a peer, it solicits from the peer the uniform resource locator ("URL"—sometimes known as a website address), of their proxy within the network via the wireless communication port. This involves the transmission of a relatively simple message in ASCII characters, which all currently manufactured computing devices (whether portable or otherwise) recognise. Once PDA 10 has received the URL of its peer's proxy, it contacts its proxy P10 via a telecommunications link, and transmits to proxy P10 this peer proxy URL. Proxy P10 then contacts the peer proxy via the internet and these two proxies engage in what amounts to negotiation on the manner in which direct wireless communication between the devices can advantageously be established. The agreed parameters for direct communication via the wireless communications port are transmitted back via the telecomms. links to the respective information devices by their respective proxies, and the devices may then engage in direct communication with each other by conforming to the agreed parameters.

This method has two principal advantages. Firstly, as mentioned above the proxies have a greater level of standardisation, and are more powerful computing entities, as a result of which they are more likely to be able to communicate with each other. Secondly, the communication channel provided by the internet has a substantially wider frequency bandwidth than that provided by, for example the infra red wireless communication link. Thus the internet communications link or channel provides, for a given ratio of signal to noise, a faster data link.

Figure 2:
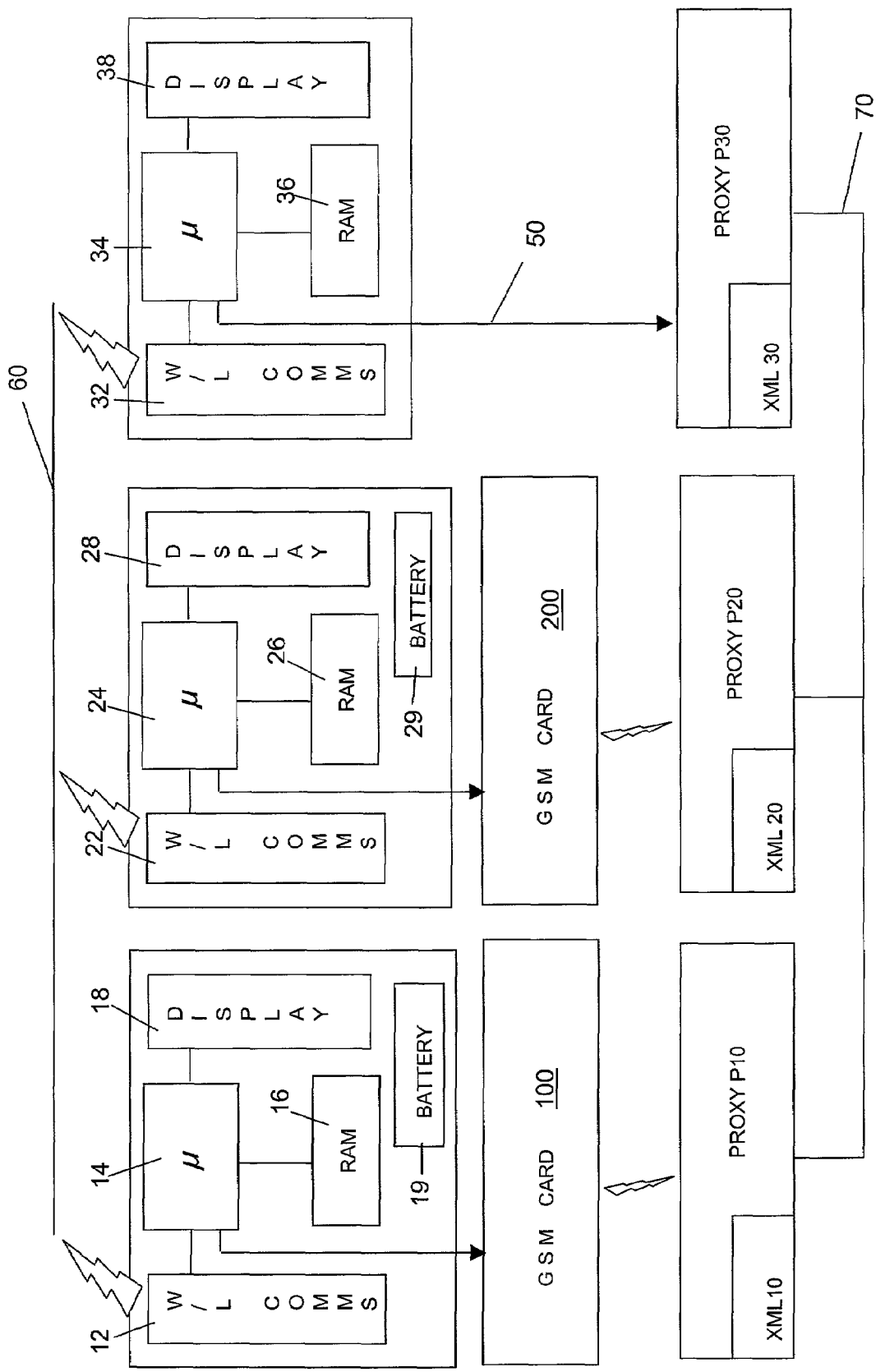
FIG. 2 is a schematic diagram illustrating the architecture of an embodiment of system according to the present invention.

Referring now to FIG. 2, the PDAs 10, 20 each comprise a processor 14, 24 connected to the wireless communication port 12, 22, together with random access memory 16, 26, a screen or monitor 18, 28, and a battery 19, 29. In addition, each of the PDAs 10, 20 is equipped with a mobile telecommunication card, in this case GSM cards 100, 200 respectively (although other standards may be employed, such as GPRS, for example). The GSM card is in essence the central working element of a mobile telephone, and so provides a PDA with access to the mobile telephone telecommunications network. Connection between a PDA and a GSM card is a straightforward matter achievable in the same manner that a current commercially available PDAs (such as the PDA sold by Hewlett-Packard under the trademark Jomada) may be connected to a currently available mobile telephone. The information device provided by the beacon 30 also comprises a wireless comms. port 32, a processor 34, and random access memory 36, and display 38 (although a display is not necessarily typical for a beacon). Additionally, because it is a fixed device, the beacon 30 does not have a GSM card, but instead makes use of a land-line telecommunications connection 50 to the proxy P30 of the beacon 30.

The system as illustrated thus has a wireless communication link, in this instance an infra red link 60, conforming to the IRDA standard, which directly connects any one of the three information devices with any other of the devices, and a telephonic link in this instance provided by a combination of GSM and conventional landline telephone lines 70, which connect the information devices to their respective proxies P10, P20, and the proxies to each other. The two communication links or channels 60, 70 have different speeds of data transmission, principally as a result of the available frequency bandwidth in each case, with the infra red channel typically (i.e. in conditions of normal use, such as in daylight, and/or in the presence of fluorescent lights) having a speed of the order of magnitude of 10 Megabits per second, while the telephonic channel has a speed in the region of 100 Megabits per second.

In the present example each of the proxies P10, P20, P30 is a program which represents its principal information device in communications with a proxy of a peer, and which is hosted on a server connected to the internet; it is possible that one or more proxies may be hosted by the same server, although this makes no difference at a conceptual level. Each proxy has a data file which includes the following data types: a specification of the capability of the principal device; data relating to the owner/user of the principal device; public key information for the purpose of enabling transmission of encrypted data directly via the wireless communications link; and policy data, from which parameters governing the how the interaction between the devices may be employed, and determining therefore such matters as the content data the principal device wishes or is willing to exchange (the applicability of the policy parameters being explained in more detail subsequently). Simply put, the primary function of the proxy is to exchange, on behalf of its principal device, selected data from the data file with a proxy of a peer device to establish parameters governing direct communication between the devices using the wireless communication link.

Figure 3:
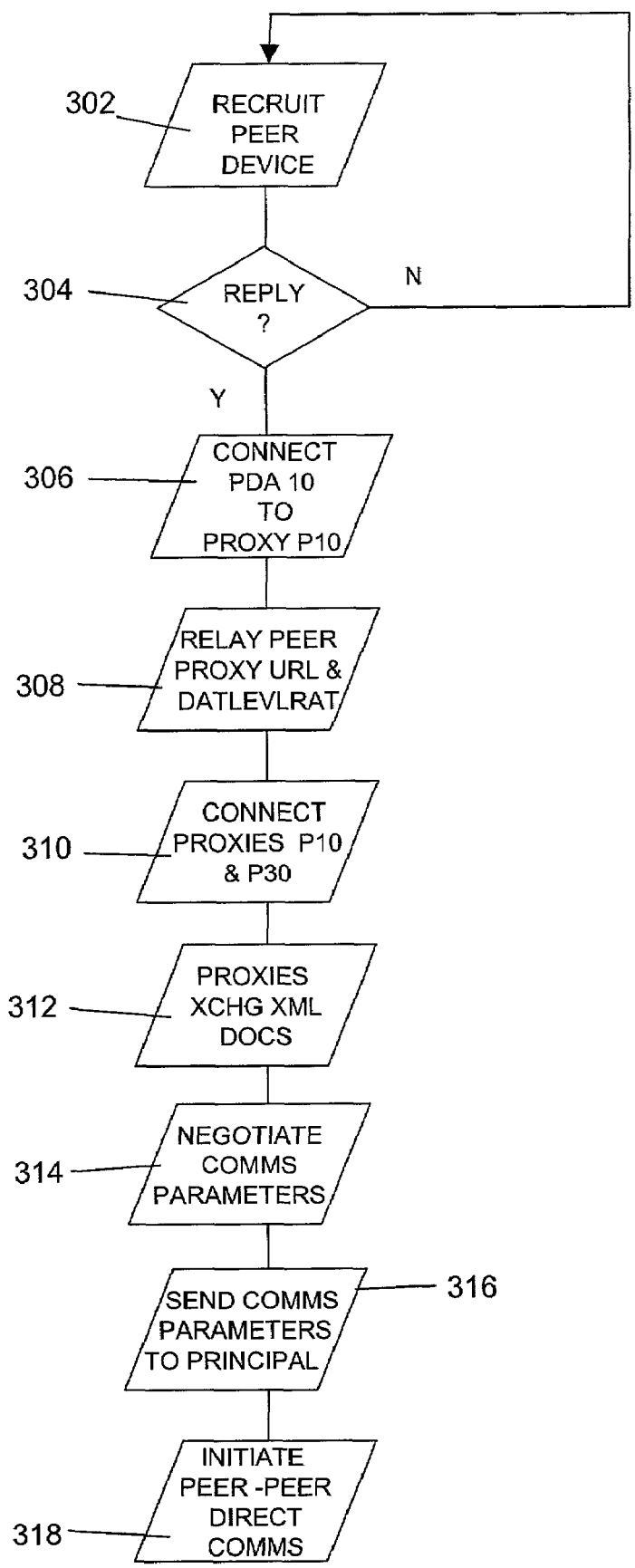
FIGS. 3, 4A and 4B are flow charts illustrating the process of an embodiment of the present invention.

Referring now to FIG. 3, one embodiment of the operation of the system described in connection with FIGS. 1 and 2 will now be described. In the exemplary scenarios of the present example, a first person (user/owner of PDA 10) may wish to contact a second person. The second person may for example be the user/owner of PDA 20, the contact being for the purpose of purchasing a copy of a spreadsheet data file as outlined above. Alternatively the first person may wish to establish contact with a peer which is fixed, such as the beacon 30, for example because the beacon 30 is situated at a location of interest to the first person. Such a location could be, for example, a shopping complex, a museum, a tourist attraction, a railway station, an airport or the trading area of a stock exchange. In this scenario, the beacon 30 operates on behalf of a legal person who is (for example) the owner or operator of the facility, and serves the function of providing data relevant to its surroundings, such as data relating to services and facilities in the environs, for example. In this illustrated embodiment, it will be assumed that the first person wishes to obtain such data, and so is seeking to establish contact with such a beacon 30.

The process begins at step 302, with the emission from the wireless comms. port 12 of PDA 10 of a recruiting signal, this being a signal emitted by a PDA seeking a peer information device with whom to communicate. Step 304 takes place after a predetermined time limit subsequent to the emission of the recruitment signal in step 302, and simply involves the processor of PDA 10 determining whether a reply has been received to the recruit signal. If no reply has been received, the process returns to step 302, with this loop continuing for as long as the user/owner wishes to establish contact with a peer. In the event that a peer information device, in this example the beacon 30, acknowledges the recruitment signal, it will do so by transmitting the URL of its proxy P30 as a reply. The emission and recognition of a recruitment signal is part of the existing protocol or standard, known as IRDA, governing wireless infra red communications, and so is provided for within virtually all currently manufactured PDAs. According to this standard, the URL of the proxy P30 is transmitted in ASCII text file, for example having a file extension ".url". However, the PDA 10 will require a degree of pre-configuration in order to recognise the URL as such, and this may be achieved by loading what is known in the art as an appropriate "applet", i.e. a very short program which acts as an adjunct to the operating system, into the PDA from a desktop PC, for example, when the PDA is docked with the PC. The creation of such an applet is a straightforward matter (typically a single page of code written in C), and so will not be discussed further.

At this juncture, PDA 10 has the URL of the beacon's proxy P30. In a modification the user/owner of PDA 10 can then transmit the URL of proxy P10 acting for PDA 10 to the beacon 30, although this is not necessary in order for the process to operate. At step 306 PDA 10 contacts its proxy P10 via the mobile telephone network, using the GSM card 100. Once contact has been established, at step 308 the PDA 10 transmits the URL of the peer device to the proxy P10 together with a data level rating (discussed in detail below), and at step 310 the proxy P10 contacts the peer proxy P30. In a further modification beacon 30 may also contact its proxy P30 with the URL of proxy P10, and possibly other data, such as data level rating information indicative of the data types it is prepared to divulge in this particular instance. (see later). Contact between the proxies P10 and P30 is made via the internet in a manner now well understood per se, and involves the proxies P10 and P30 exchanging data in the form of XML documents or files containing data relating to their principal devices at step 312. Subsequent to the exchange of XML documents, at step 314 the proxies P10 and P30 engage in any negotiation necessary in order to determine between them parameters governing direct communication between their principals 10, 30 which are acceptable to both. In its simplest form this amounts simply to agreeing, on the basis of the data within the XML data documents, the nature (e.g. size, file type, and speed of their transmission) of messages to be exchanged in order that both the principal devices are intrinsically capable of understanding the messages. At step 316 any agreed parameters are sent back to the principals from their respective proxies, whereupon the PDA 10 then contacts beacon directly in accordance with the agreed parameters, at step 318. This interaction is a relatively rapid process (the every day experiences of the speed of the internet in retrieving, e.g. complex web pages not being applicable here, since the XML documents that are being transmitted are exceedingly small compared to the amount of data that is required to transmit, e.g. a banner advert, or an image).

As mentioned above, in the present embodiment, data relating to their principals 10, 30 is exchanged between the proxies P10, P30 in the form of data documents or data files. In the present example, these documents are written in Extensible Markup Language ("XML"). Data relating to a principal device to be included in the XML document is typically transmitted to the proxy when the principal-proxy relationship is initially set up (e.g. when a principal PDA or other device registers with a proxy computing entity), and so no data of this type needs to be transmitted from the principal to the proxy in normal use. In the present example, four data types are envisaged: capability data, relating to the intrinsic capability of the principal device; User/Owner data concerning the identity of the user/owner of the principal device; Public Key data, required in the event that direct communications between peer devices is to be encrypted; and Policy data, which is used to agree policy parameters which, as referenced above govern how the interaction between the devices may be used.

A data level rating system is employed to denote the data the principal device wishes the proxy to include in the XML file transmitted to a peer proxy. The data level rating system employed depends upon the level of flexibility required in relation to the different combinations of types of data it is desired to communicate directly to a peer device, this automatically determining the various combinations of parameters on which it is necessary to reach agreement with a peer proxy. Thus for example, one relatively simplified data level rating system could be:

| Data level rating | Data Type(s) |
| --- | --- |
| A | Capability (1) |
| B | Capability & Owner/User (1, 2) |
| C | Capability, Owner/User & Public Key (1, 2 & 3) |
| D | Capability, Owner/User, Public Key & Policy (1, 2, 3 & 4) |

In the event that it is desired to transmit different combinations of data types (e.g. Capability & Public Key), further data level ratings will be required to represent them up to a maximum of N!, where N is the number of different possible types of data; in this example 4.

Figure 4A:
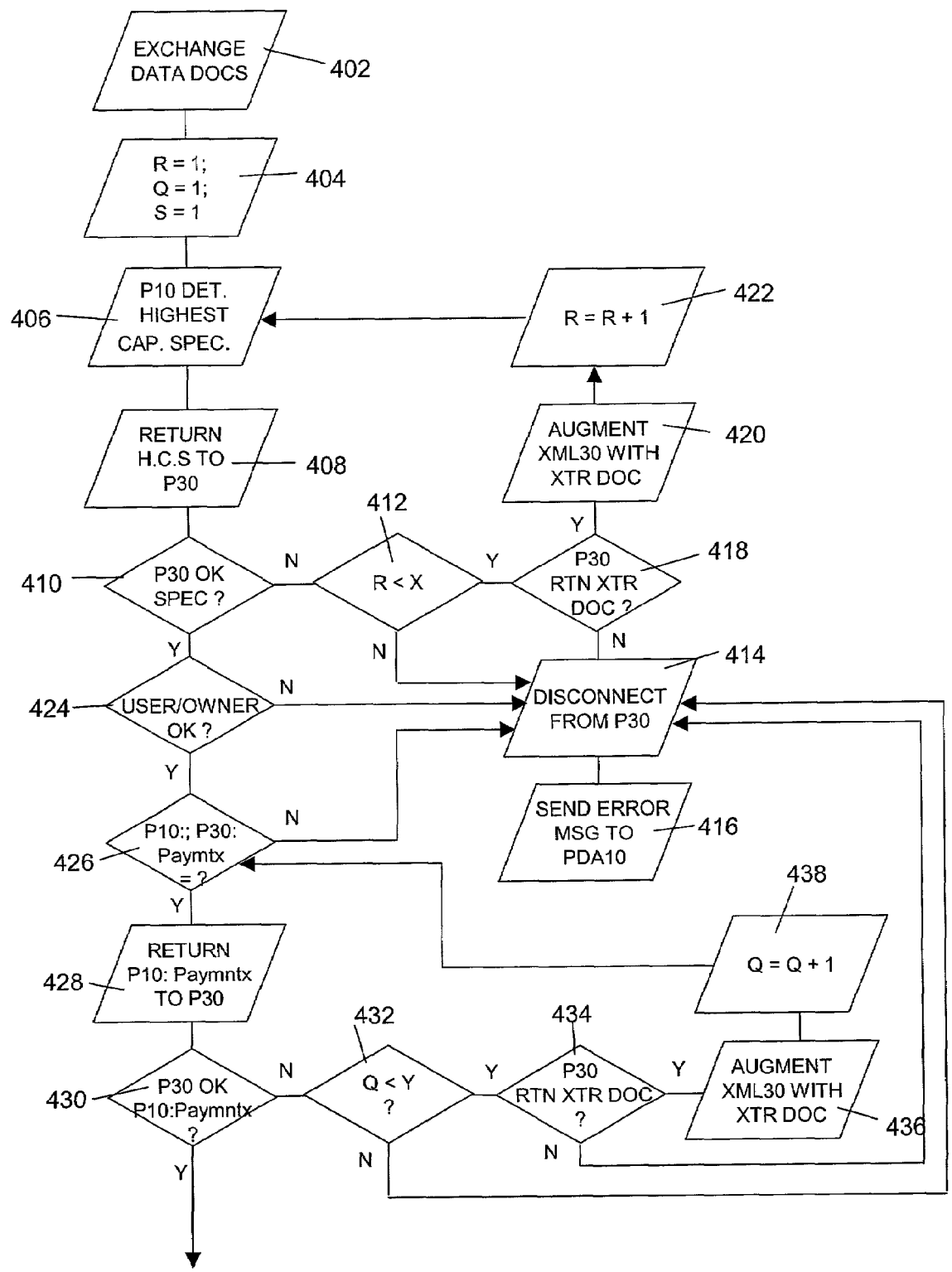
Figure 4B:
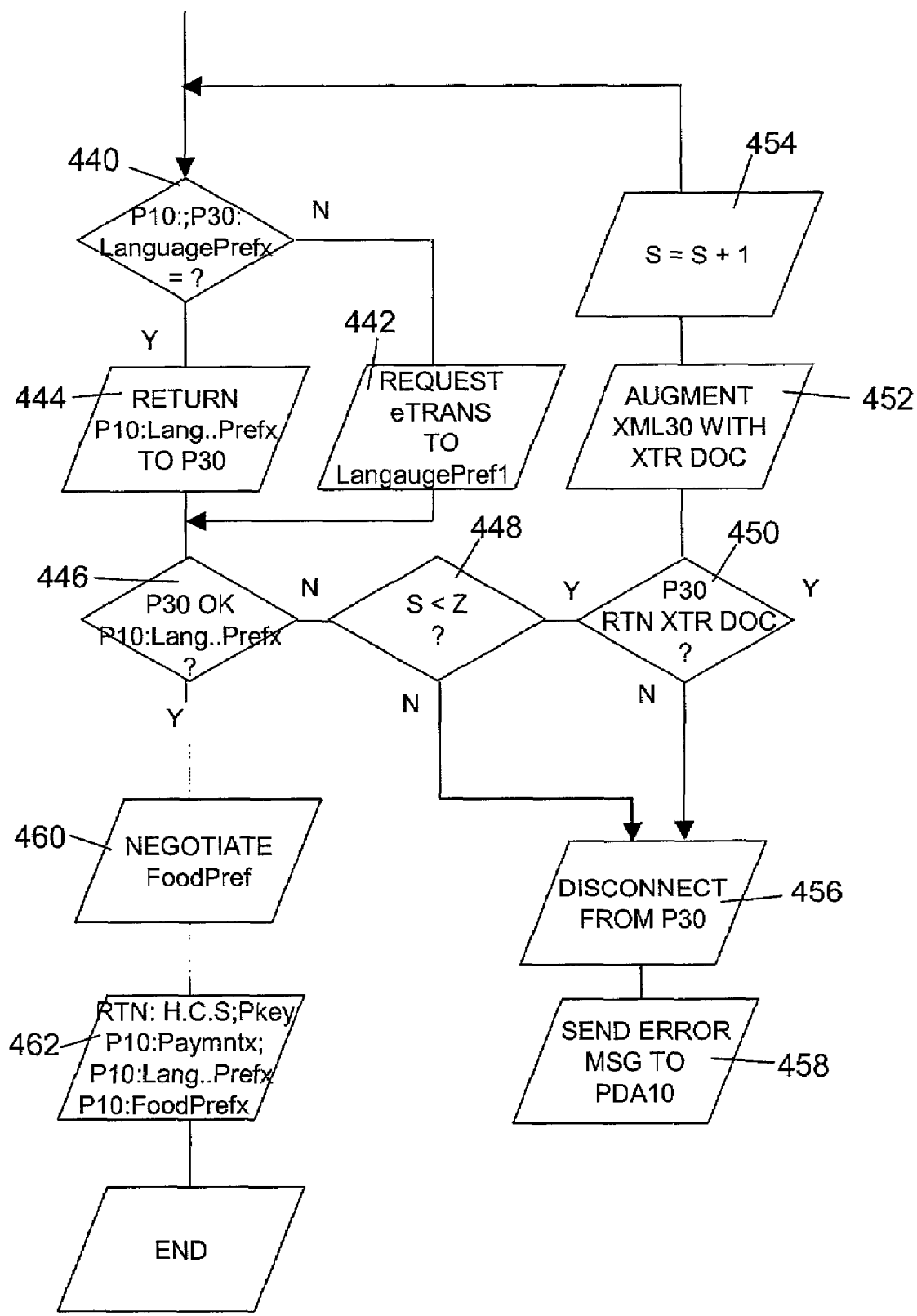

The process of negotiating agreed parameters governing the direct communication is in essence governed by the operation of a computer program that is the proxy P10, but however also includes interaction with proxy P30, and will now be described with reference to FIGS. 4 to 6. Referring to FIG. 4A, the process begins when at step 402, proxy P10 sends a document XML10, containing data of data level rating D (in accordance with instructions from its principal issued at step 308 above) to proxy P30, and in reply, proxy P30 returns a document XML30 containing data having the same data level rating. It may happen, as discussed above, that beacon 30 contacts proxy P30 directly, and indicates a different permissible data level rating to that requested by proxy P10 (this being one possible reason for each of the devices contacting their proxies independently, rather than simply proxy P10 being contacted by PDA 20 with the URL of proxy P30, and proxy P10 then soliciting data from P30). In this event, depending upon the nature of the data type that is absent from the document XML30, proxy P10 either disconnects, or simply skips negotiation on the missing data type, and passes on to the next data type.

The data documents XML10 and XML30 are shown in FIGS. 5 and 6, and will be discussed in more detail in due course. It should be noted that it is not necessary for the proxies to exchange data documents, since a sufficient degree of "agreement" concerning parameters governing direct communications between their principals can be reached with, in this case, the active proxy P10 simply soliciting a data document from P30, and then determining, without either dispatching to P30 its own data document, or any participation from P30, a specification of parameters which it then returns to principal PDA 10. However, an exchange of documents is preferred in order that a more comprehensive negotiation may take place.

Following transmission of the file XML10, the proxy sets a series of iteration tracking variables Q, R and S to 1, at step 404, these variables having the function of controlling the maximum number of communications in a given negotiation. The first and most fundamental part of the negotiation is agreement upon basic parameters for direct communication between the principals so that the intrinsic information processing and storage capability of each device is taken into account. Referring now additionally to FIGS. 5 and 6, the capability of each of the principal devices 10, 30 is detailed in the documents XML10 and XML30 under the tags <P10:Capability> and <P30:Capability> respectively. From the tags within this category it can be seen that data relating to the maximum rate of data transmission in Kilo bytes per second, ("MaxBaudKbpersec"), the cache size in Megabytes ("CacheSizeMb"), screen size in pixels ("ScreenSizePxl") and the screen type are set out. The various tags which denote these types of data must be standardised tag names, or at least tag names capable of conversion using rdf, in order to make the content of the documents meaningful to people other than the author. However, this requirement for standardisation of the XML tags involved should not to be regarded as a particularly limiting technical factor in implementing the invention. Agreement on such matters as tag names for particular purposes occurs continually under the auspices of a consortium known as W3C, concerned with establishing of standards for Internet activity, and in which many major multinational companies actively participate. Thus obtaining such agreement is in no way comparable to the difficulty associated with achieving the degree of standardisation of those features of information devices, and particularly portable information devices, which would be required in order to obviate the need to employ the present invention.

At step 406, proxy P10 compares corresponding elements of the capability data type in order to establish parameters which effectively determine the highest possible specification for the two principal devices that is common to both of them. In this instance it can be seen for example that the specification of beacon 30 set out in XML30 is inferior in every respect to that of PDA10, and so in this instance the highest common specification is that of beacon 30. At step 408, the proxy P10 returns to proxy P30 its highest common specification, in order that proxy P30 may check this for any inconsistencies with the capability of its principal device, beacon 30. Such inconsistencies may occur for example because of an error in proxy P10 (e.g. the two XML documents have not been properly compared), or because of updated information from the principal of proxy P30 which is available to the proxy P30, but is not yet reflected in the data document. At step 410, proxy P10 determines whether, proxy P30 has raised any objections (e.g. because of inconsistencies), this being signified simply by whether proxy P30 has sent back any communication responding to the highest common specification proposal from P10 within a given time window of its dispatch. In the event that P30 has objected, proxy P10 then determines at step 412 whether the iteration tracking variable R is lower than a number x, usually preset by the principal upon set-up of the proxy relationship. If it is not, this signifies that the maximum permissible number of iterative communications with the proxy P30 has been reached, whereupon at step 414 proxy P10 disconnects from proxy P30, and at step 416 returns an error message to its principal PDA 10. Use of the iteration tracking variable is designed to limit the cost of proxy services per communication (due e.g. to the cost of telecommunications connections). In the event that the maximum number of iterations has not been exceeded, at step 418 proxy P10 checks to determine that the objection raised by P30 conforms to the protocol governing proxy communications, which requires that the proxy P30 return an objection in the form of a further XML document. If this has not occurred, then the disconnection and error message steps 414 and 416 follow, since the protocol has been broken. If a further document has been returned, then proxy P10 augments the data document XML30 using the material from the further document at step 420, and at step 422 augments the iteration tracking variable R by 1. The program then returns to determining a highest common spec. on the basis of the two XML data documents at step 406, together with the subsequent steps until either disconnection occurs, or agreement is reached with proxy P30.

The elements of device capability which have been used in the present example to illustrate the process of negotiation by proxy represent only a small proportion of the possible data elements in the capability data type, and indeed the usual such number on which agreement may typically be reached. For example, usually parameters related to the operating system of the principal devices, application software, permissible file types (capable of assimilation), etc., will be established. Conversely it is not necessary to include all possible data elements; for example in the event that one of the devices does not have a screen, for example (which is particularly feasible in the case of a fixed beacon), this data element may simply be omitted, and the proxy P10 will then compile a highest common specification which does not include any visual monitor.

Following conclusion of an agreement on the highest common capability specification, the proxy P10 then considers the next data type specified by the data level rating, in this example data elements within the User/Owner category. At step 424 the proxy P10 determines whether the user/owner of the peer device 30 is acceptable. Examples of cases in which the User/Owner may not be are because they are a known criminal, belong to an organisation (such as a commercial competitor) with whom it is not considered prudent to communicate in this manner, or because they are not creditworthy, for example. Data and conditions determining whether a User/Owner is or is not acceptable are part of the data provided to the proxy upon setup of the proxy-principal relationship. Thus, in the event that the User/Owner of peer device 30 is not acceptable, the steps 414, 416 of disconnection and dispatch of an error message already described above follow. If the User/Owner is acceptable, then at step 426 the proxy P10 determines whether one or more of the payment methods offered in its data document XML10 is acceptable to proxy P30, by determining whether there is a common payment type. From a comparison of the documents XML10 and XML30 it can be seen that the user/owner of PDA 10 is willing to pay either by visa card (tagged as <P10:Paymt1>), or an imaginary form of electronic cash called CampagCash (tagged as <P10:Paymt2>), whereas the user/owner of beacon 30 is only prepared to accept visa payment (tagged in XML30 as <P30:Paymt1>. At step 428 proxy P10 returns the common payment method most preferred in XML10 (i.e. having the lowest version number, Paymt1 being preferable to Paymt2) to proxy P30 for agreement. At step 430, proxy P10 determines, in the manner described above in relation to step 410, whether proxy P30 has agreed to the proposed payment method. An objection to the proposed payment method is most likely to have the form either of a modification, or additional terms to the payment method set out in the XML document. Thus for example if payment is to be made by visa card, the principal to proxy P30 may have stipulated that payment is cleared prior to dispatch of any goods steps. In the even that an objection is received steps 432-438 follow in the same way as steps 412, 418, 420 and 422 above, leading once again to the determining step of 426 described above, following which after one or more further iterations, either agreement is reached, or disconnection occurs.

Having concluded the payment negotiations, the final negotiations that are required relate to the policy determining parameters, since no negotiations are required in relation to an exchange of public keys for transmission of encrypted data. At step 440 proxy P10 determines whether there is a common language specified in the language element of the policy data type. If there is no common language, then at step 442 the proxy P10 requests that proxy P30 invoke the use of an electronic translation for data transmitted, this being less exacting and therefore less preferable than the proper provision of a lingua franca for PDA 10, but nonetheless should facilitate a degree of communication that would not otherwise be possible. In the event that there is a common language specified in the data documents XML10 and XML30, at step 444 proxy P10 selects the common language of highest preference, and returns this to P30. At step 446 proxy P10 determines whether proxy P30 has raised any objections, whereupon if an objection is raised, steps 448 to 454 follow, these being equivalent to steps 410, 412, 418, 420 and 422 mutatis mutandis, likewise, in the event that agreement is not reached, the same applies to the disconnection and error message steps 456, 458 on the one hand, and steps 414, 416 on the other.

The discovery of a lack of common language and subsequent request for an electronic translation is, in process terms equivalent to proxy P30 failing to agree on a language proposed by proxy P10, and so following the step of requesting an electronic translation, step 446 follows, once again followed by steps 448 to 454, and possibly if appropriate the disconnection and error message steps 456, 458.

Agreement between the proxies on the further policy data element illustrated herein and denoted by the tag <FoodPref> is conducted in a similar manner to the previously described negotiations, and to avoid needless repetition the various processes involved in the negotiation have been bundled together under reference numeral 460.

The various policy data elements which may be included in the policy data type are extremely numerous, and although only two have been illustrated, many more may be added as desired, and in a practical situation would most probably be. Thus for example, policy data could be used to agree a parameter which sets a spending limit using a credit card whose number has been provided, or in the event that a person owning a portable device knows in advance that they are going to be entering a region populated by beacons, for example in a foreign country, that person will typically contact the proxy P10 and either update or otherwise tailor policy data elements to probable requirements on the forthcoming trip in order to agree more appropriate parameters.

For instance, in the event that a user is going to an Islamic country, the policy data could be modified to reflect a desire to avoid consuming any alcohol.

Following conclusion of all of the necessary negotiations, proxy P10 returns to its principal, PDA 10, at step 462 the parameters which will govern direct communications between the devices, viz the highest common specification for communication between devices 10 and 30, the public key of device 30, the payment preference which is common to both devices, language preference common to both devices, and the food preference of the user/owner of PDA 10, with which information the two devices may now communicate directly effectively, conduct commercial transactions, and beacon 30 may provide PDA 10 with relevant information relating to appropriate places to eat.

Once direct communications between two devices has been established, a number of types of interaction are then possible. In the present embodiment, the two devices communicate directly with each other via the IR wireless port, however since the beacon is a fixed device, and is likely therefore to have hard-wired connection to its proxy, the beacon may advantageously be in constant contact with its proxy P30 during the course of communication with the PDA 10. This may be particularly advantageous where the user of the PDA is walking through an area populated by a plurality of beacons at differing locations, all of which have the same or similar capability (a single proxy negotiation thus serving to determine the parameters for interaction with all of the beacons due to their identity/similarity). One or both devices remaining in constant contact with their proxy may relay information to their proxy which they have received from the peer for processing, while using the direct wireless communication to transmit and receive the information from peer to peer; during this time the proxies are not usually in contact with each other.

Figure 7:
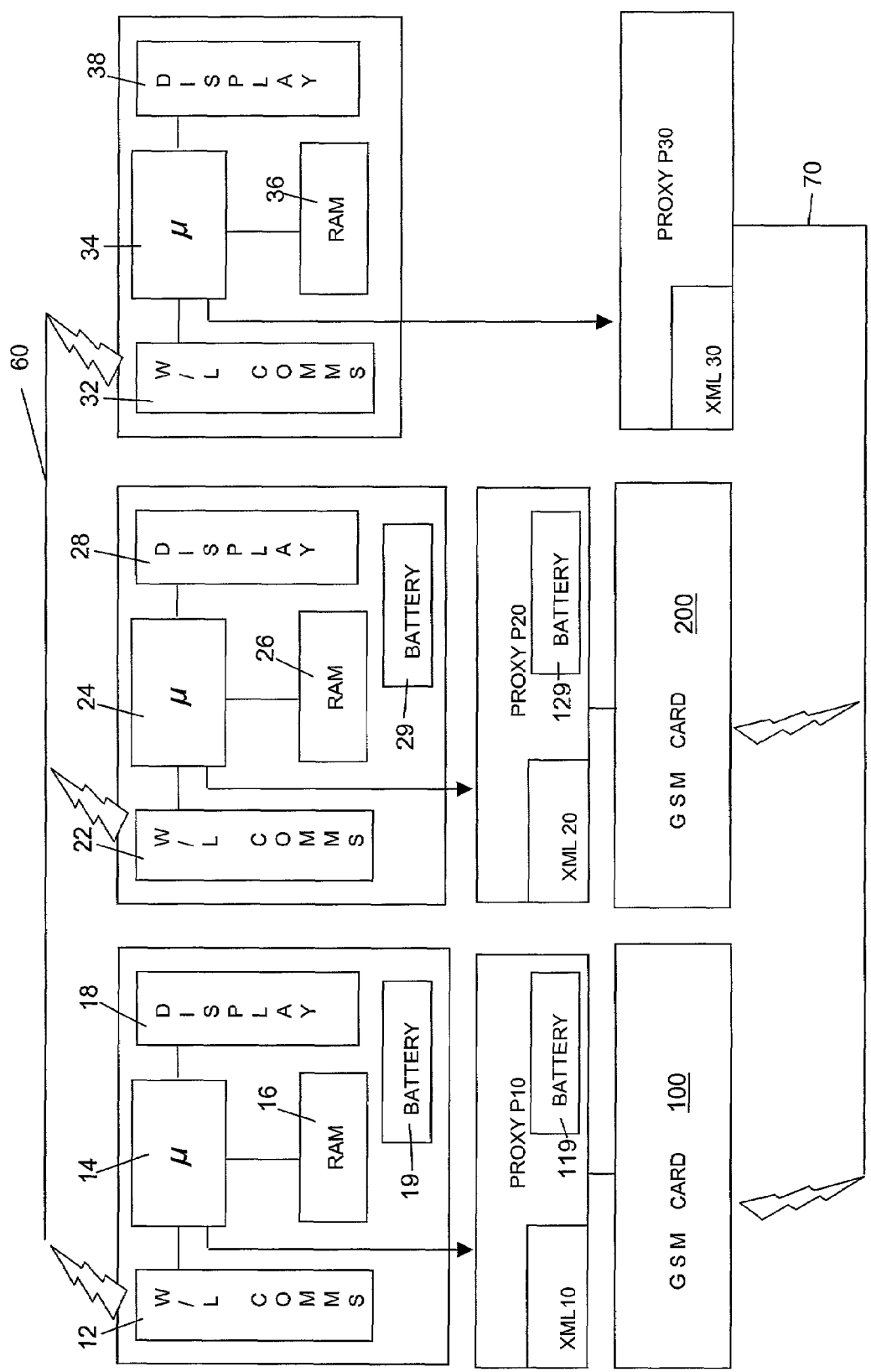
FIG. 7 is a modification of the system architecture shown in FIG. 2.

The invention has been exemplified using proxies which are remote from the devices and which have fixed location. This is not essential, and referring now to FIG. 7 a modification of the system architecture shown in FIG. 2 is illustrated. Thus in the case of a portable device the proxy may be provided by a laptop computer (powered by a battery B19 and B29 for proxies P10 and P20 respectively) and a hardwire connection from the device to the proxy, with the proxy provided by the laptop computer connecting to another proxy (whether similarly provided by a laptop or not) via a mobile telephone connection; the proxies thus also may be said to have the function of routing the second communication channel 70 between the devices. This configuration still enjoys the benefits of pre-configured direct connection between, for example, two portable information devices using a low cost wireless communications link, the pre-configuration being firstly a result of the ability of the proxy to negotiate appropriate parameters for the direct interaction, and secondly, and entirely independently a result of the negotiation being conducted via a communication link having a significantly greater frequency bandwidth for a given signal to noise ratio.

Figure 8:
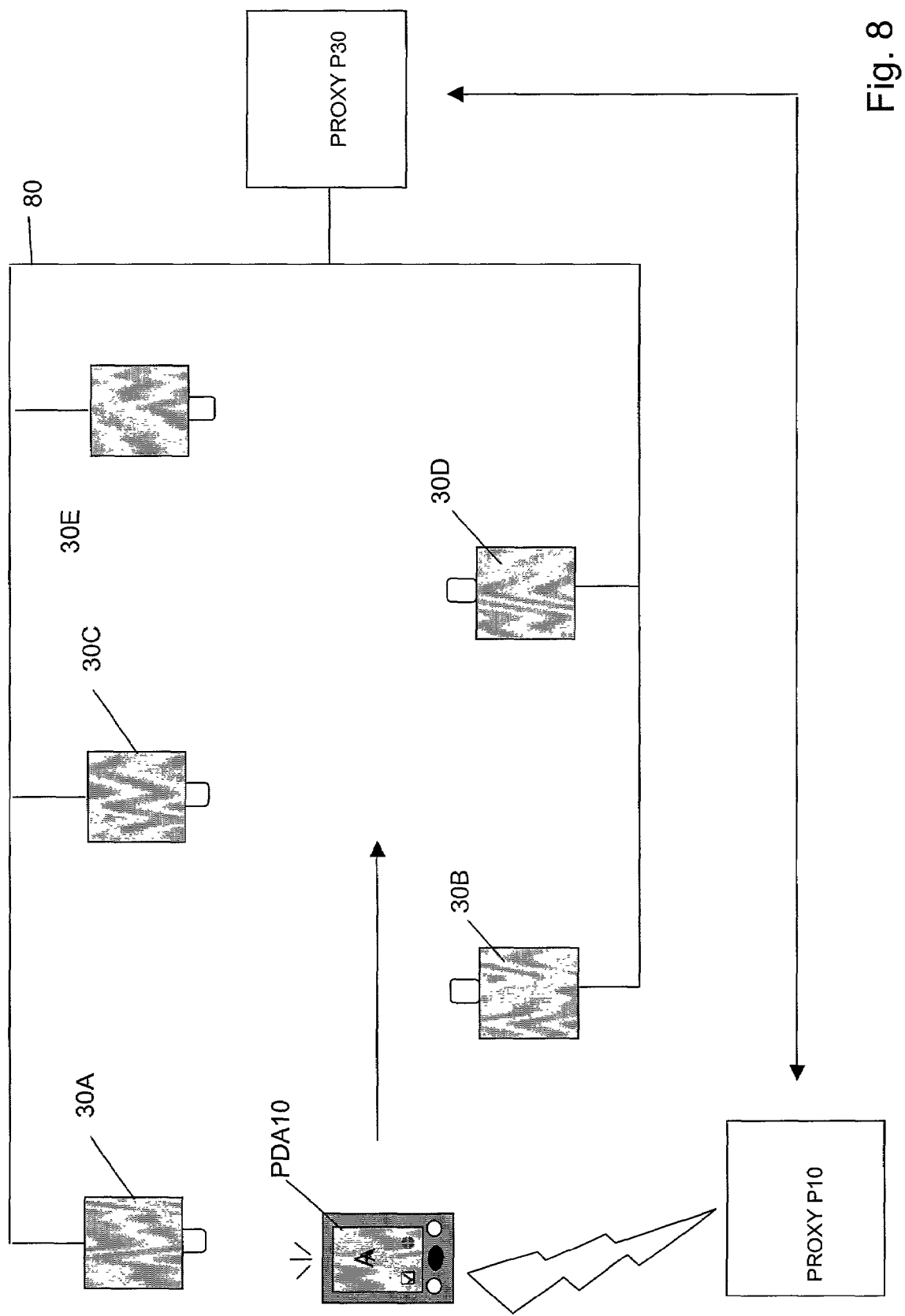
FIG. 8 is a schematic illustration of a modified scenario of use for an embodiment of the present invention.

Although only dual device interaction has been described in detail, multi-device interaction is envisaged, such as in the case of the multiple beacon-populated area described above. Referring now to FIG. 8, a user having PDA 10 is moving through an area populated with a plurality of beacons 30. The system architecture of the information devices and proxies involved in the illustrated scenario is essentially the same as that described in connection with FIG. 1, the significant difference being that a plurality of second information devices, in this instance beacons 30, are connected to a single proxy P30. In the present example the user of PDA 10 is walking through an airport, and the PDA 10 is continually emitting a recruitment signal to engage the nearest beacon, thus sequentially recruiting contact with beacons 30A-E as the user travels in the direction indicated by arrow A. In the present example, each of the proxies 30A-E remains permanently connected to the proxy P30 via the hard-wired connection 50, and a telephone connection 80, and so can track the movement of the PDA 10 through the area simply by monitoring with which beacon 30A-E the PDA is in instantaneous contact, and provide via that beacon information conforming to the policy data elements agreed between the proxies and which is relevant to the instantaneous location of the PDA. Thus for example this may have relevance in an airport where the beacons can effectively guide the PDA 10 user to a particular duty free shop.

In the present example, following conclusion of negotiations between the proxies P10 and P30, which occurred on recruitment of beacon 30A by PDA 10, policy parameters relating to the nature of duty free goods which the user of PDA 10 wishes to purchase have been established between the proxies P10 and P30. The proxy P30 has access to data relating to the various retail outlets that are located at particular points at the airport, provided by the "user" of the beacons 30 (which in this example is typically likely to be a provider of information services, most probably contracted to a consortium including retailers and other service providers within the airport). By monitoring which beacon 30 is most proximal to the PDA 10, the proxy P30 is thus able to determine where the user of PDA 10 is in relation to one or more given retail outlets meeting the criteria set out in the policy parameters. Thus, if a relevant retail outlet is situated in close proximity to beacon 30C, as the user of PDA 10 passes beacon 30A the proxy P30 sends a message to beacon 30A instructing it to send a message via the wireless link to PDA 10, giving directions to beacon 30B (the for example in terms of landmarks within the airport), whereupon directions would then be given from beacon 30B to beacon 30C, and then on to the retail outlet or outlets in question. Simultaneously, and in accordance with further policy parameters, the proxy P30 may indicate (possibly in response to a query from PDA 10, or as a result of a further policy parameter) that the retail outlet is located, for example, 10 minutes walk the instantaneous location of the user of PDA 10, 5 minutes walk from their departure gate, and that the plane the user wishes to catch has been delayed by 20 minutes.

In a further modification, by including the use of known technologies applicable to infra red communications in accordance with the IRDA standard, it is possible to determine the proximity of a PDA from an individual beacon; that is to say the location of the PDA within a particular beacon's range, or cell, as opposed to which cell the device is located in. An example of such a technology is the use of CHIRP radar technology. The messages sent to the PDA 10 in the above example may then be further modified in accordance with the such physical proximity data Additionally, in the case of portable devices three or more portable devices may interact with each other using different parameters to govern the interaction of any two.

It is not intended that the various aspects of the invention described herein are limited to an association with the embodiments in connection with which they were described; all such aspects are intended, unless otherwise indicated, to have general applicability.

The invention claimed is:

1. A method of communication between first and second information devices, at least one of which is portable, the method comprising:
   initiating communication between the devices using a first channel of communication having a first speed of data transmission;
   using the first channel, passing at least one message between the devices containing data enabling interconnection of the first and second devices via a second channel of communication having a second speed of data transmission, faster than the first speed;
   using the second channel to exchange data between the devices to establish ul least one parameter governing data exchange between the devices via the first channel, wherein the second channel of communication includes first and second intermediate entities which route communications from the first and second devices respectively, and the first and second intermediate entities act as proxies for the first and second devices; and
   conducting communication between the devices using at least the first channel in accordance with the at least one parameter and relaying messages received by at least one of the devices via the first channel to the proxy of that device.

2. A method according to claim 1, wherein the first channel has a first frequency bandwidth, and the second channel has a second frequency bandwidth, which is wider than the first frequency bandwidth.

3. A method according to claim 1 wherein the first and second proxies are each accessible through the internet.

4. A method according to claim 1 wherein the first channel is provided by a wireless communication link.

5. A method according to claim 4, wherein the wireless communication link is infra red.

6. A method according to claim 4 wherein the wireless communication link is bluetooth.

7. A method according to claim 1 wherein the second channel includes a wireless communication link.

8. A method according to claim 7 wherein the aforesaid wireless communication link is provided by a mobile telephone link.

9. A method according to claim 1 further comprising the step, performed by the proxy, of processing the relayed messages, and sending a message back to the at least one device.

10. A method according to claim 9 wherein the first device is a portable information device and the second device is a beacon having a fixed location.

11. A method according to claim 10 further comprising the steps of:
    moving the first device through a plurality of beacons;
    determining on the basis of which beacon is in communication with the first device, the physical location of the first device;
    providing to the first device, via the first channel, information influenced by the location of the first device.

12. A method according to claim 11 wherein the beacons all have a common proxy.

13. A method according to claim 1 wherein the at least one parameter relates to at least one of the following: processing and storage capability of the first and second devices; encryption of data to be transmitted between the first and second devices; and policy determining how the first channel of communication may be used.

14. A method of communicating between first and second devices, at least one of which is portable, the method comprising:
   passing data from one device to another along a first communication link, the data enabling the devices to establish communication via a second link faster than the first link;
   using the second link to establish at least one parameter governing communication via the first link, wherein the second link of communication includes first and second intermediate entities which route communications from the first and second devices respectively, and the first and second intermediate entities act as proxies for the first and second devices; and
   communicating via the first link in accordance with the at least one parameter and relaying messages received by at least one of the devices via the first link to the proxy of that device.

15. A method according to claim 14 wherein the first link is provided by wireless communication.

16. A method according to claim 14 wherein the second link has less noise than the first link.

17. A method according to claim 14 wherein the second link has a greater frequency bandwidth than the first link.

18. A method according to claim 14 wherein prior to establishing communication via the second link, the data passed to one of the devices via the first link includes the address of at least one of the proxies.

19. A method of communicating between first and second devices, at least one of which is portable, the method comprising:
   passing data from one of the devices to another, along a first communication link, to enable the devices to communicate with each other via a second communication link which has a frequency bandwidth greater than the first link's bandwidth;
   establishing communication between the devices via the second link to establish rules governing communication via the first link, wherein the second communication link of communication includes first and second intermediate entities which route communications from the first and second devices respectively, and the first and second intermediate entities act as proxies for the first and second devices; and
   communicating via the first link in accordance with the rules, to exchange data relating to content and relaying messages received by at least one of the devices via the first communication link to the proxy of that device.

20. A method according to claim 19 wherein the first link is a wireless communication medium.

21. A method according to claim 20 wherein the second link is a wireless communication medium.

22. A method according to claim 19 wherein a portable first device communicates with a plurality of second devices whose location is substantially fixed.

23. A method according to claim 22 wherein the second devices are beacons distributed throughout a commercial space.

24. A method according to claim 23 wherein the beacons are in one of an airport, a shopping mall, a museum, a tourist attraction.

* * * * *